United States Patent
Watson et al.

(10) Patent No.: US 12,529,851 B2
(45) Date of Patent: Jan. 20, 2026

(54) TERMINATION GUIDE LABEL FOR TWIN-ROW FIBER OPTIC CONNECTOR WITH A GUIDING BLOCK INCLUDING PEAKS AND VALLEYS

(71) Applicant: Ortronics, Inc., New London, CT (US)

(72) Inventors: Matthew Cameron Watson, Morganton, NC (US); Daniel M. Smith, Westerly, RI (US)

(73) Assignee: Legrand DPC, LLC, West Hartford, CT (US)

( * ) Notice: Subject to any disclaimer, the term of this patent is extended or adjusted under 35 U.S.C. 154(b) by 147 days.

(21) Appl. No.: 17/476,685

(22) Filed: Sep. 16, 2021

(65) Prior Publication Data
US 2023/0084830 A1    Mar. 16, 2023

(51) Int. Cl.
*G02B 6/38* (2006.01)

(52) U.S. Cl.
CPC ......... *G02B 6/3895* (2013.01); *G02B 6/3831* (2013.01)

(58) Field of Classification Search
CPC ............................ G02B 6/3895; G02B 6/3831
See application file for complete search history.

(56) References Cited

U.S. PATENT DOCUMENTS

| | | | | |
|---|---|---|---|---|
| 3,937,493 A * | 2/1976 | Fasbender | ............... | B42F 17/00 283/41 |
| 4,240,848 A * | 12/1980 | Barber | ............. | G06K 19/06009 156/475 |
| 4,249,973 A * | 2/1981 | Hamisch, Jr. | ....... | B65C 11/0247 156/216 |
| 4,329,191 A * | 5/1982 | Barber | ................... | G06K 19/08 156/DIG. 47 |
| 4,523,776 A * | 6/1985 | Barber | ................... | B42F 21/04 428/40.1 |
| 4,544,182 A * | 10/1985 | Spring | ................... | B42F 21/04 283/37 |
| 4,580,815 A * | 4/1986 | Barber | ................... | B42F 21/04 40/641 |
| 5,162,069 A * | 11/1992 | Morris | ................. | B65C 9/1892 242/615 |
| 5,376,217 A * | 12/1994 | Janssen, Jr. | ......... | B32B 38/1833 156/542 |
| 5,379,538 A * | 1/1995 | Osborne | .................... | G09F 3/10 156/227 |
| 6,752,431 B1 * | 6/2004 | Matthews | ............. | G09F 3/0289 428/354 |
| 7,547,227 B1 * | 6/2009 | Gibson | ................ | H01R 13/465 439/491 |
| 7,943,240 B2 * | 5/2011 | Zama | .................... | F16F 15/005 428/692.1 |

(Continued)

Primary Examiner — Andrew Jordan
(74) Attorney, Agent, or Firm — McCarter & English, LLP (57) ABSTRACT

An example fiber optic connector label is provided that includes a main body section, a first group of fiber designations, and a second group of fiber designations. The main body section includes a top surface and an opposing bottom surface. The main body section includes a lateral axis extending through first and second side edges of the main body section, the lateral axis dividing the main body section into a first side and a second side. The first group of fiber designations is located on the first side of the main body section. The second group of fiber designations is located on the second side of the main body section.

17 Claims, 5 Drawing Sheets

(56) References Cited

U.S. PATENT DOCUMENTS

| | | | | |
|---|---|---|---|---|
| 7,980,890 B2* | 7/2011 | Gibson | G09F 3/10 | 283/81 |
| 8,137,003 B2* | 3/2012 | Shannon | G02B 6/4292 | 385/86 |
| 8,358,894 B2* | 1/2013 | Martin-Regalado | G02B 6/4401 | 385/100 |
| 8,483,539 B2* | 7/2013 | Shannon | G02B 6/4246 | 385/139 |
| 8,994,547 B2* | 3/2015 | German | H04Q 1/136 | 340/687 |
| 9,995,899 B2* | 6/2018 | Boxer | G02B 6/4482 | |
| 10,222,560 B2* | 3/2019 | Bauco | G02B 6/0006 | |
| 10,222,561 B2* | 3/2019 | Bauco | G02B 6/4292 | |
| 10,488,613 B2* | 11/2019 | Boxer | G02B 6/4436 | |
| 10,545,298 B2* | 1/2020 | Bauco | G02B 6/4482 | |
| 10,585,257 B1* | 3/2020 | Smith | G02B 6/4482 | |
| 11,295,135 B2* | 4/2022 | Brun | H04L 41/0895 | |
| 11,353,662 B2* | 6/2022 | Leigh | G02B 6/406 | |
| 11,374,808 B2* | 6/2022 | Brun | H04L 41/12 | |
| 11,527,338 B2* | 12/2022 | Yun | G02B 6/3817 | |
| 2006/0093282 A1* | 5/2006 | Shepherd | G02B 6/3831 | 385/136 |
| 2006/0138766 A1* | 6/2006 | Kielland | G11B 23/40 | |
| 2009/0260268 A1* | 10/2009 | Gibson | H01R 13/465 | 156/60 |
| 2010/0040334 A1* | 2/2010 | Shannon | G02B 6/4292 | 385/92 |
| 2011/0043333 A1* | 2/2011 | German | H04Q 1/136 | 340/815.45 |
| 2011/0188041 A1* | 8/2011 | Martin-Regalado | G02B 6/4482 | 385/100 |
| 2012/0207436 A1* | 8/2012 | Shannon | G02B 6/4292 | 385/77 |
| 2013/0125924 A1* | 5/2013 | Martin-Regalado | G02B 6/4401 | 385/100 |
| 2016/0299309 A1* | 10/2016 | Boxer | G02B 6/4482 | |
| 2017/0315302 A1* | 11/2017 | Hao | G02B 6/447 | |
| 2018/0074275 A1* | 3/2018 | Thompson | G02B 6/4454 | |
| 2018/0172923 A1* | 6/2018 | Bauco | G02B 6/3855 | |
| 2018/0172924 A1* | 6/2018 | Bauco | G02B 6/562 | |
| 2018/0172942 A1* | 6/2018 | Bauco | G02B 6/3878 | |
| 2018/0267268 A1* | 9/2018 | Boxer | G02B 6/4436 | |
| 2019/0219783 A1* | 7/2019 | Ly | G02B 6/4403 | |
| 2020/0183114 A1* | 6/2020 | Golzalvez | G02B 6/443 | |
| 2020/0192041 A1* | 6/2020 | Griffiths | G02B 6/4482 | |
| 2020/0341201 A1* | 10/2020 | Leigh | G02B 6/4284 | |
| 2021/0374406 A1* | 12/2021 | Brun | G06F 16/24569 | |
| 2022/0068523 A1* | 3/2022 | Yun | G02B 6/447 | |
| 2022/0075137 A1* | 3/2022 | Womack | G02B 6/4482 | |
| 2022/0141082 A1* | 5/2022 | Brun | H04L 41/0654 | 709/223 |
| 2023/0042715 A1* | 2/2023 | Brun | G06Q 10/0875 | |
| 2023/0084830 A1* | 3/2023 | Watson | G02B 6/4482 | 385/53 |

* cited by examiner

TERMINATION GUIDE LABEL FOR TWIN-ROW FIBER OPTIC CONNECTOR WITH A GUIDING BLOCK INCLUDING PEAKS AND VALLEYS

BACKGROUND

A variety of fiber optic connectors are used in the telecommunications industry. As demands for higher bandwidth and fiber optic connections increase, the fiber count within the individual fiber optic connectors increases. As such, greater care must be taken to ensure that termination of fibers with the correct polarity is achieved. In particular, the individual fibers entering the fiber optic connector must be placed in the correct positions relative to the connector key to ensure proper polarity. With different types of fiber optic connectors in the industry, correct termination of fibers is susceptible to errors in the field. In addition, after termination has been completed, the density of fiber optic connectors in a datacenter, for example, can make it difficult to visually inspect for proper termination.

SUMMARY

Embodiments of the present disclosure provide an exemplary fiber optic connector label configured to be placed on an internal component of the fiber optic connector to guide technicians in termination of fibers. Once applied, the connector label can include color-coded guides for correctly mapping out the fiber color sequence in each row of the fiber optic connector (e.g., a twin-row fiber optic connector, or the like) prior to termination of the connector. Post-termination, the label enables visual inspection of the termination before final assembly of the connector housing. The label therefore reduces the risk of incorrect fiber optic cable polarity.

In accordance with embodiments of the present disclosure, an exemplary fiber optic connector label is provided. The label includes a main body section, a first group of fiber designations, and a second group of fiber designations. The main body section includes a top surface and an opposing bottom surface. The main body section includes a lateral axis extending through first and second side edges of the main body section. The lateral axis divides the main body section into a first side and a second side. The first group of fiber designations is located on the first side of the main body section. The second group of fiber designations is located on the second side of the main body section.

In some embodiments, the first and second groups of fiber designations can include numerical values corresponding with fiber positions for routing. In some embodiments, the numerical values in the second group of fiber designations can be inverted relative to the numerical values in the first group of fiber designations. In some embodiments, the numerical values can be sequentially from 1 to 8. In some embodiments, the numerical values sequentially alternate between the first group of fiber designations and the second group of fiber designations. In some embodiments, the first and second groups of fiber designations can be color-coded based on a fiber subunit color code. In some embodiments, the fiber subunit color code can be based on a TIA-598 industry standard.

In some embodiments, the label can include a first cutout inwardly formed in the first side edge of the main body section, and a second cutout inwardly formed in the second side edge of the main body section. The first and second cutouts can be aligned with the lateral axis. A width of the main body section as measured between the first and second side edges can be dimensioned greater than a width of the main body section at the first and second cutouts.

In some embodiments, the label can include a first key indicator including an arrow on the first side of the main body section. The first key indicator can be configured to orient the main body section relative to a keying element of a fiber optic connector. In some embodiments, the label can include a second key indicator including an arrow on the second side of the main body section. The second key indicator can be inverted relative to the first key indicator.

In some embodiments, the label can include a text area including information regarding a polarity convention of the first and second groups of fiber designations. The label can include adhesive applied to the opposing bottom surface. The label can include a backing sheet applied to the adhesive.

In accordance with embodiments of the present disclosure, an exemplary method of applying a label to a connector is provided. The method includes adhering a first side of the label to a top surface of the connector. The label includes a main body section including a top surface and an opposing bottom surface. The main body section includes a lateral axis extending through first and second side edges of the main body section. The lateral axis divides the main body section into the first side and a second side. The label includes a first group of fiber designations located on the first side of the main body section, and a second group of fiber designations located on the second side of the main body section. The method includes wrapping the label around an edge of the connector. The method includes adhering the second side of the label to an opposing bottom surface of the connector.

In accordance with embodiments of the present disclosure, an exemplary connector is provided. The connector includes a housing (e.g., including a keying element on one side of the housing). The connector includes an internal component at least partially disposed within the housing. The connector includes a label adhered to at least a portion of the internal component. The label includes a main body section including a top surface and an opposing bottom surface. The main body section includes a lateral axis extending through first and second side edges of the main body section. The lateral axis divides the main body section into a first side and a second side. The label includes a first group of fiber designations located on the first side of the main body section, and a second group of fiber designations located on the second side of the main body section.

The first side of the label is configured to be adhered to a top surface of the internal component. A portion of the main body section of the label between the first and second sides is configured to be wrapped around an edge of the internal component. The second side of the label is configured to be adhered to an opposing bottom surface of the internal component.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the connector label, reference is made to the accompanying figures, wherein.

DETAILED DESCRIPTION

Figure 1:
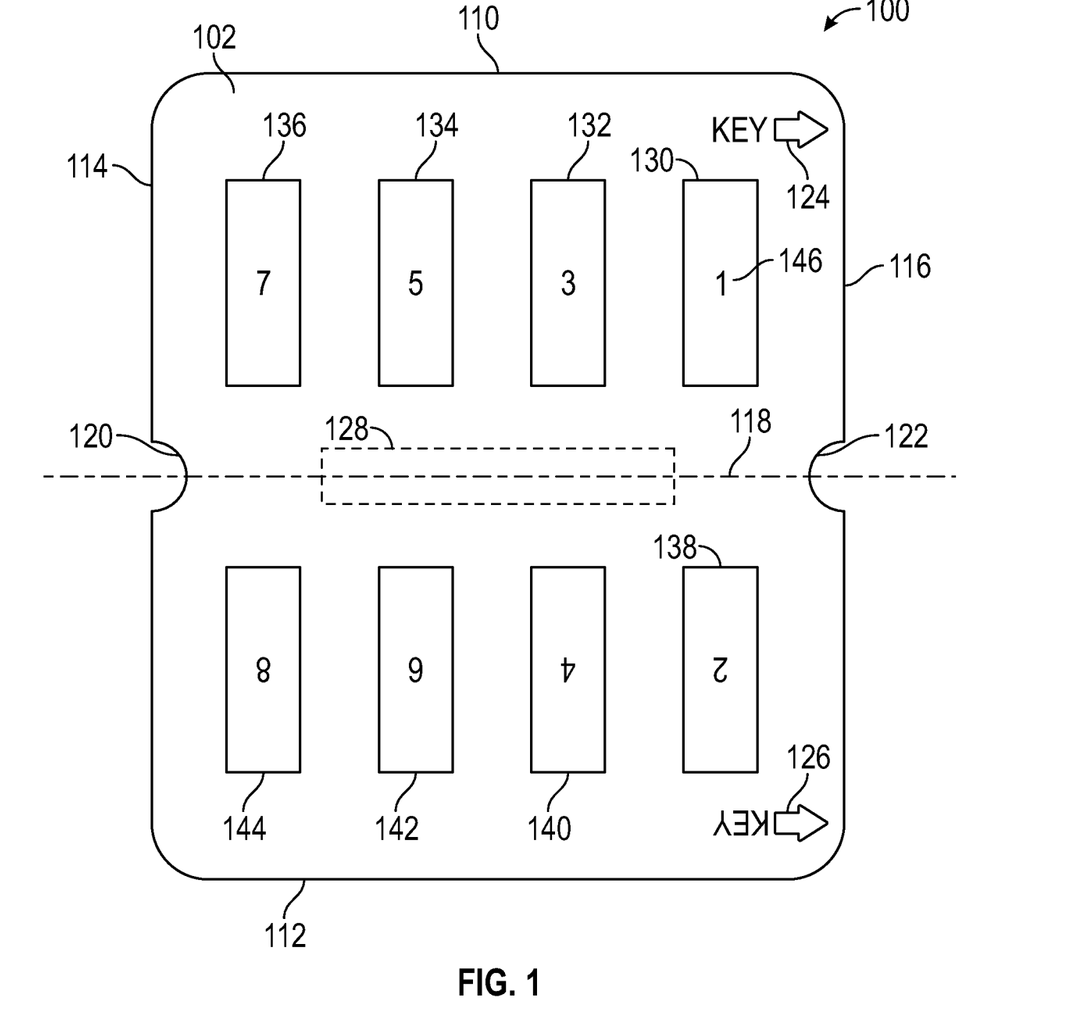
FIG. 1 is a top view of a connector label in an exemplary embodiment.
Figure 2:
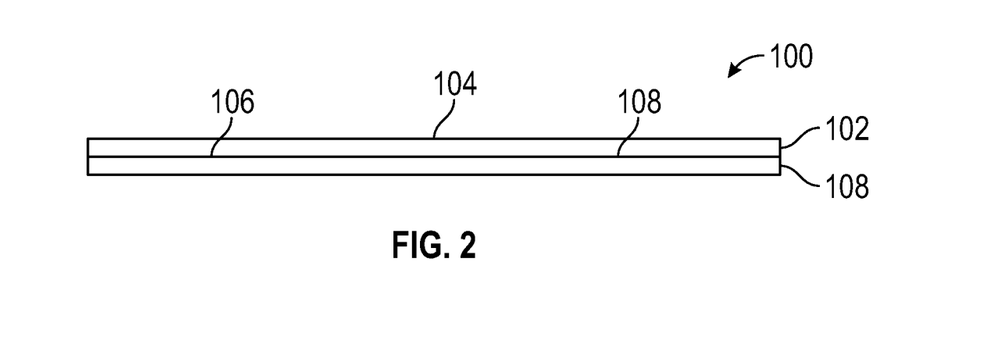
FIG. 2 is a side view of the connector label of FIG. 1.

FIGS. 1 and 2 are top and side views of an exemplary fiber optic connector label 100 (hereinafter "label 100") of the present disclosure. The label 100 acts as an internal polarity termination label for a fiber optic connector, such as a twin-row fiber optic connector. The label 100 includes a main body section 102 including a top surface 104 and a bottom surface 106. The label 100 can include an adhesive 108 spread across the bottom surface 106. A backing sheet 108 can be applied over the adhesive 108 and can be removed when a user is ready to apply the label 100 to a fiber optic connector.

The main body section 102 of the label 100 can define a substantially planar, thin or sheet-like configuration. The label 100 includes a distal or top edge 110, a proximal or bottom edge 112, and side edges 114, 116. The edges 110, 112 can extend parallel (or substantially parallel) to each other, and the edges 114, 116 can extend parallel (or substantially parallel) to each other, thereby defining a substantially rectangular configuration of the label 100 with rounded edges. In some embodiments, the thickness of the label 100 as measured between the top and bottom surfaces 104, 106 can be about, e.g., 0.05-0.15 mm inclusive, 0.05-0.14 mm inclusive, 0.05-0.13 mm inclusive, 0.05-0.12 mm inclusive, 0.05-0.11 mm inclusive, 0.05-0.1 mm inclusive, 0.05-0.09 mm inclusive, 0.05-0.08 mm inclusive, 0.05-0.07 mm inclusive, 0.05-0.06 mm inclusive, 0.06-0.15 mm inclusive, 0.07-0.15 mm inclusive, 0.08-0.15 mm inclusive, 0.09-0.15 mm inclusive, 0.1-0.15 mm inclusive, 0.11-0.15 mm inclusive, 0.12-0.15 mm inclusive, 0.13-0.15 mm inclusive, 0.14-0.15 mm inclusive, 0.07-0.13 mm inclusive, 0.09-0.11 mm inclusive, 0.05 mm, 0.06 mm, 0.07 mm, 0.08 mm, 0.09 mm, 0.1 mm, 0.11 mm, 0.12 mm, 0.13 mm, 0.14 mm, 0.15 mm, or the like. In some embodiments, the length of the label 100 as measured between the edges 110, 112 can be about, e.g., 14-19 mm inclusive, 14-18 mm inclusive, 14-17 mm inclusive, 14-16 mm inclusive, 14-15 mm inclusive, 15-19 mm inclusive, 16-19 mm inclusive, 17-19 mm inclusive, 18-19 mm inclusive, 15-18 mm inclusive, 16-17 mm inclusive, 16-18 mm inclusive, 14 mm, 15 mm, 16 mm, 17 mm, 17.5 mm, 18 mm, 19 mm, or the like. In some embodiments, the width of the label 100 as measured between the edges 114, 116 can be about, e.g., 10-17 mm inclusive, 10-16 mm inclusive, 10-15 mm inclusive, 10-14 mm inclusive, 10-13 mm inclusive, 10-12 mm inclusive, 10-11 mm inclusive, 11-17 mm inclusive, 12-17 mm inclusive, 13-17 mm inclusive, 14-17 mm inclusive, 15-17 mm inclusive, 16-17 mm inclusive, 11-16 mm inclusive, 12-15 mm inclusive, 13-14 mm inclusive, 10 mm, 11 mm, 12 mm, 13 mm, 14 mm, 15 mm, 16 mm, 17 mm, or the like. Although exemplary dimensions are provided, it should be understood that the size of the label 100 can be adjusted depending on the size of the fiber optic connector receiving the label 100.

The label 100 includes a central lateral axis 118 extending through the edges 114, 116. The axis 118 splits the label 100 into two substantially equal halves (e.g., a top half and a bottom half). Aligned with the axis 118, the label 100 includes a first inwardly directed cutout 120 (e.g., a notch) formed in the edge 114, and second inwardly directed cutout 122 formed in the edge 116. In some embodiments, the cutouts 120, 122 can be substantially semi-circular with a diameter of about, e.g., 1-2 mm inclusive, 1-1.9 mm inclusive, 1-1.8 mm inclusive, 1-1.7 mm inclusive, 1-1.6 mm inclusive, 1-1.5 mm inclusive, 1-1.4 mm inclusive, 1-1.3 mm inclusive, 1-1.2 mm inclusive, 1-1.1 mm inclusive, 1.1-2 mm inclusive, 1.2-2 mm inclusive, 1.3-2 mm inclusive, 1.4-2 mm inclusive, 1.5-2 mm inclusive, 1.6-2 mm inclusive, 1.7-2 mm inclusive, 1.8-2 mm inclusive, 1.9-2 mm inclusive, 1.1-1.9 mm inclusive, 1.2-1.8 mm inclusive, 1.3-1.7 mm inclusive, 1.4-1.6 mm inclusive, 1 mm, 1.1 mm, 1.2 mm, 1.3 mm, 1.4 mm, 1.5 mm, 1.6 mm, 1.7 mm, 1.8 mm, 1.9 mm, 2.0 mm, or the like. The cutouts 120, 122 face each other from opposing directions of the label 100. Due to the cutouts 120, 122, the width of the label 100 at the cutouts 120, 122 is dimensioned smaller than the overall width of the label 100. In some embodiments, the width of the label 100 at the innermost points of the cutouts 120, 122 (e.g., at the axis 118) can be about, e.g., 10-15 mm inclusive, 10-14 mm inclusive, 10-13 mm inclusive, 10-12 mm inclusive, 10-11 mm inclusive, 11-15 mm inclusive, 12-15 mm inclusive, 13-15 mm inclusive, 14-15 mm inclusive, 11-14 mm inclusive, 12-14 mm inclusive, 10 mm, 11 mm, 12 mm, 13 mm 13.5 mm, 14 mm, 15 mm, or the like. The cutouts 120, 122 can serve as a locator for positioning the label 100 relative to an edge of an internal component of the fiber optic connector, and indicate the area at which the label 100 is to be folded over the edge of the internal component. The label 100 can therefore be folded along the axis 118 to wrap around and adhere the label 100 to opposing sides of the internal component of the fiber optic connector.

The top surface 104 of the label 100 includes a first key indicator 124 (e.g., orientation indicating text) at or near the corner of the edges 110, 116, and a second key indicator 126 at or near the corner of the edges 112, 116. The indicators 124, 126 include a "KEY" designation with an arrow pointing towards the edge 116. The indicators 124 are configured to point to a key located on an outer surface of the fiber optic connector housing, and assist with proper orientation of the label 100 when the user is adhering the label 100 to the internal component of the fiber optic connector. Although shown on the upper and lower corners on the right side of the label 100, the indicators 124, 126 can be in different areas of the label 100 depending on the type of fiber optic connector being used. The text of the indicators 124, 126 is inverted (e.g., a mirror image) such that when the label 100 has been folded over and adhered to opposing sides of the fiber optic connector, flipping over of the connector results in the correct orientation of the text.

The label 100 can include text in a central area 128 to indicate the polarity convention to be applied to the trunk connector being terminated for the fiber optic connector. As an example, the polarity can be, e.g., Type C— End A; Type C— End B; 24 Fiber Harness—Leg 1, with opposing Rx and Tx designations; 24 Fiber Harness—Leg 2, with opposing Rx and Tx designations; 24 Fiber Harness—Leg 3, with opposing Rx and Tx designations; Array Cord—Univ Flipped; Array Cord—Universal; or the like. The polarity designations can be varied depending on the specific wiring of the fiber optic connector being used and/or the application.

The top surface 102 of the label 100 includes fiber designations 130-144 (e.g., rectangular blocks) that correspond with each of the respective fibers to be terminated in the connector. Fiber designations 130-136 (e.g., a first group of fiber designations) are located on one side of the axis 118 of the label 100 in a spaced manner relative to each other between the edges 114, 116, and fiber designations 138-144 (e.g., a second group of fiber designations) are located on the opposing side of the axis 118 of the label 100 in a spaced manner relative to each other. The fiber designations 130-136 and fiber designations 138-144 are aligned with each other in a mirror image orientation across the axis 118.

Each of the fiber designations 130-144 can include a numerical position value 146 to indicate the order of fibers for termination (e.g., 1-8), with the values alternating across the axis 118. The text of the numerical position values 146 for fiber designations 138-144 is inverted relative to the text of the fiber designations 130-136, which results in a correct orientation of the text when the label 100 has been adhered to opposing sides of the internal component of the fiber optic connector.

Figure 3:
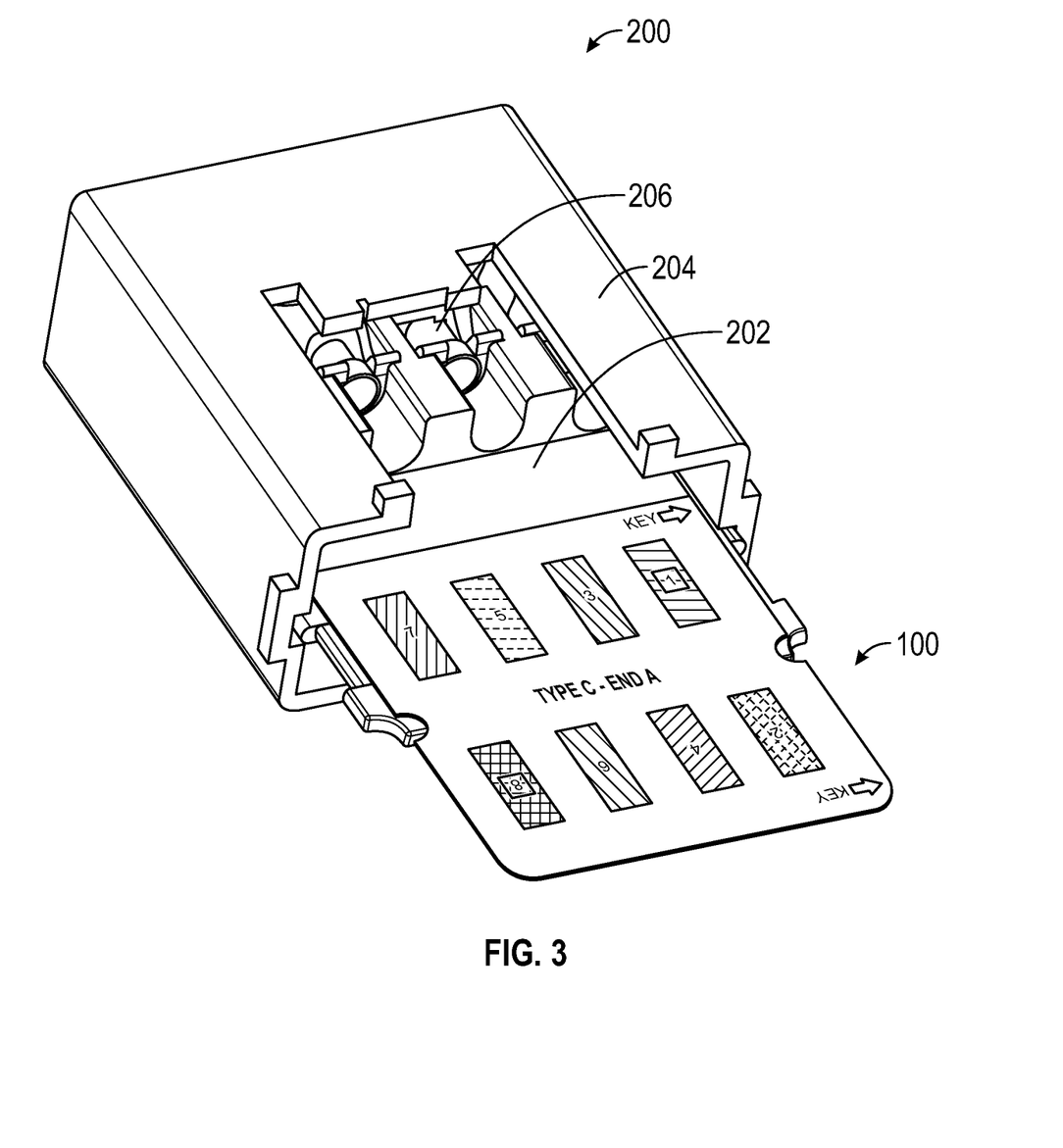
FIG. 3 is a left perspective view of a connector label partially adhered to a fiber optic connector in an exemplary embodiment.
Figure 4:
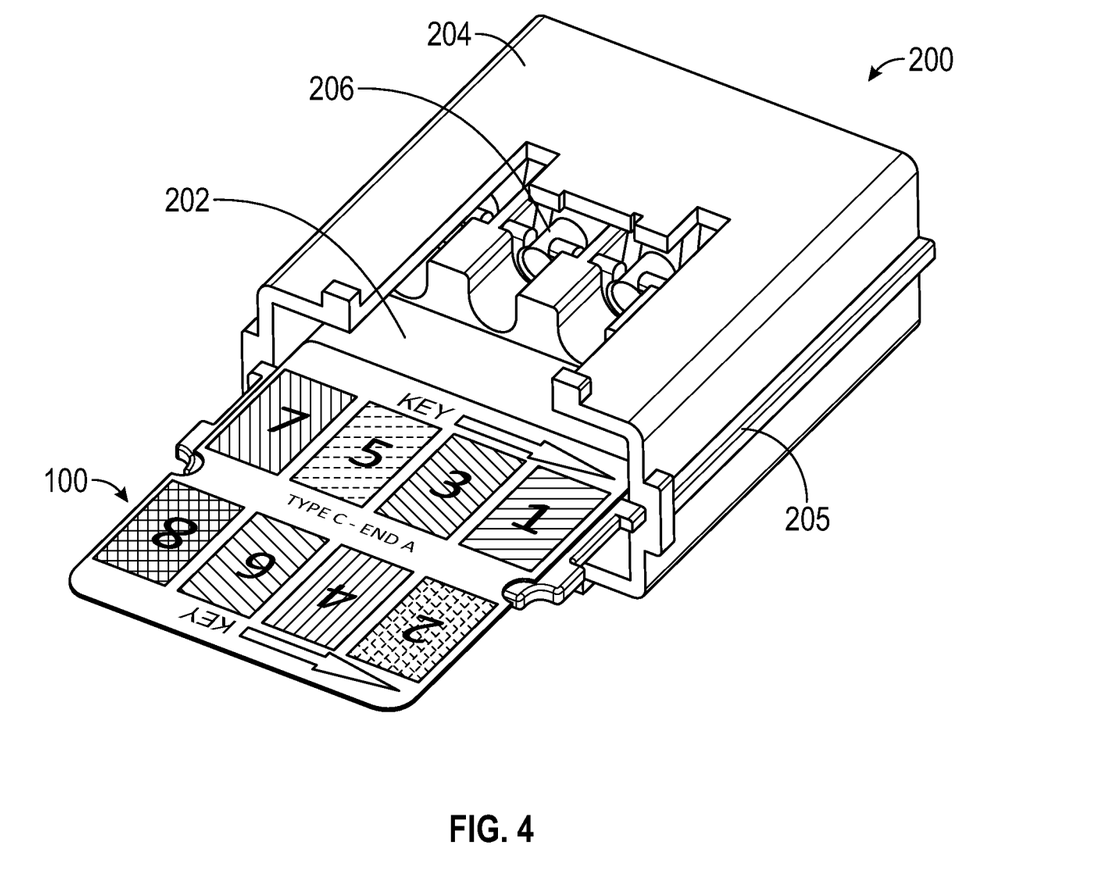
FIG. 4 is a right perspective view of a connector label partially adhered to a fiber optic connector in an exemplary embodiment.
Figure 5:
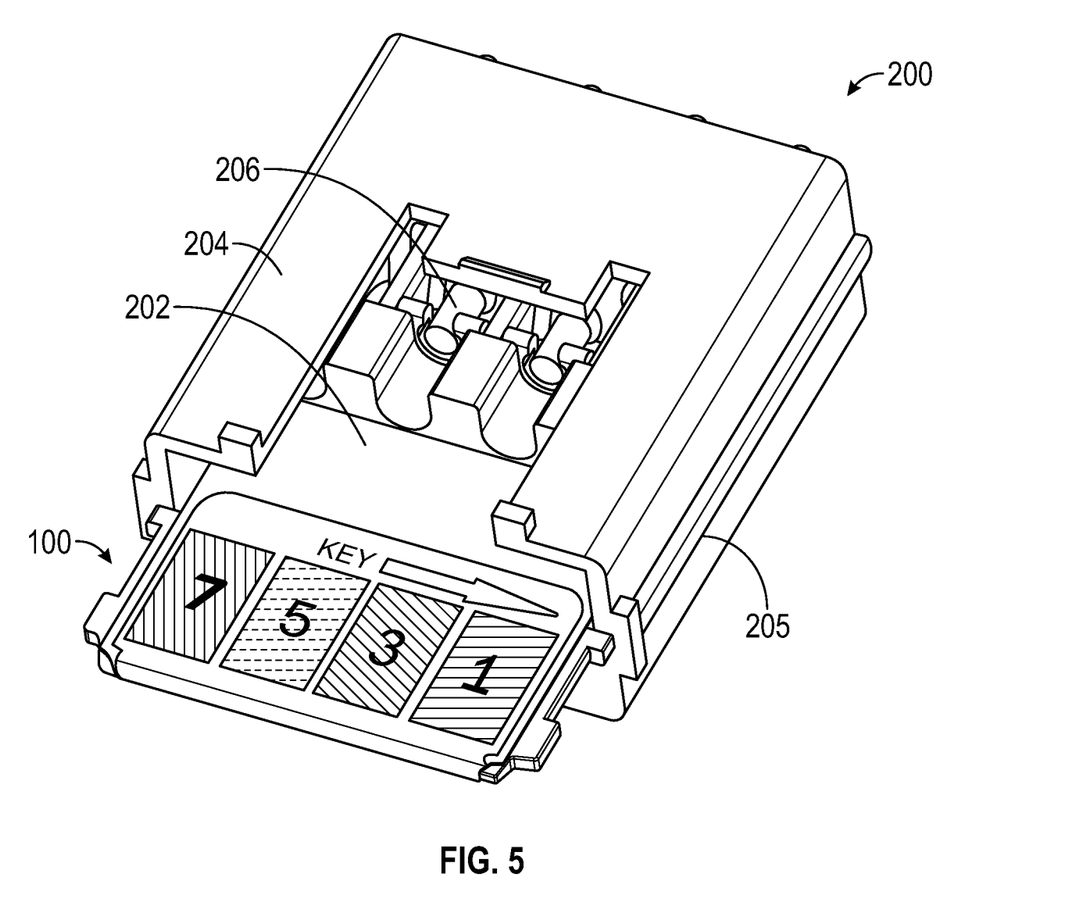
FIG. 5 is a right perspective view of a connector label fully adhered to a fiber optic connector in an exemplary embodiment.

Each of the fiber designations 130-144 can be color-coded (e.g., color-coded strips) based on the TIA-598 Optical Fiber Cable Color Coding industry standard to indicate the fiber subunit color code designations aligned with each of the fiber positions (see, e.g., FIGS. 3-5 which illustrate the different colors using shading). In some embodiments, the color coding can be, e.g., blue, green, gray, red, orange, brown, white, and black, with the colors of the fiber designations 130-144 corresponding with the outer sheath of the fiber to be routed in each respective position. Such color-coding acts as a guide and clearly indicates which color fiber should be routed to each ferrule position of the optical fiber connector, assisting with both the routing of the fiber by the technician, as well as providing a visual aid for inspection of the termination work once completed and before the connector backshell has been applied.

Figure 6:
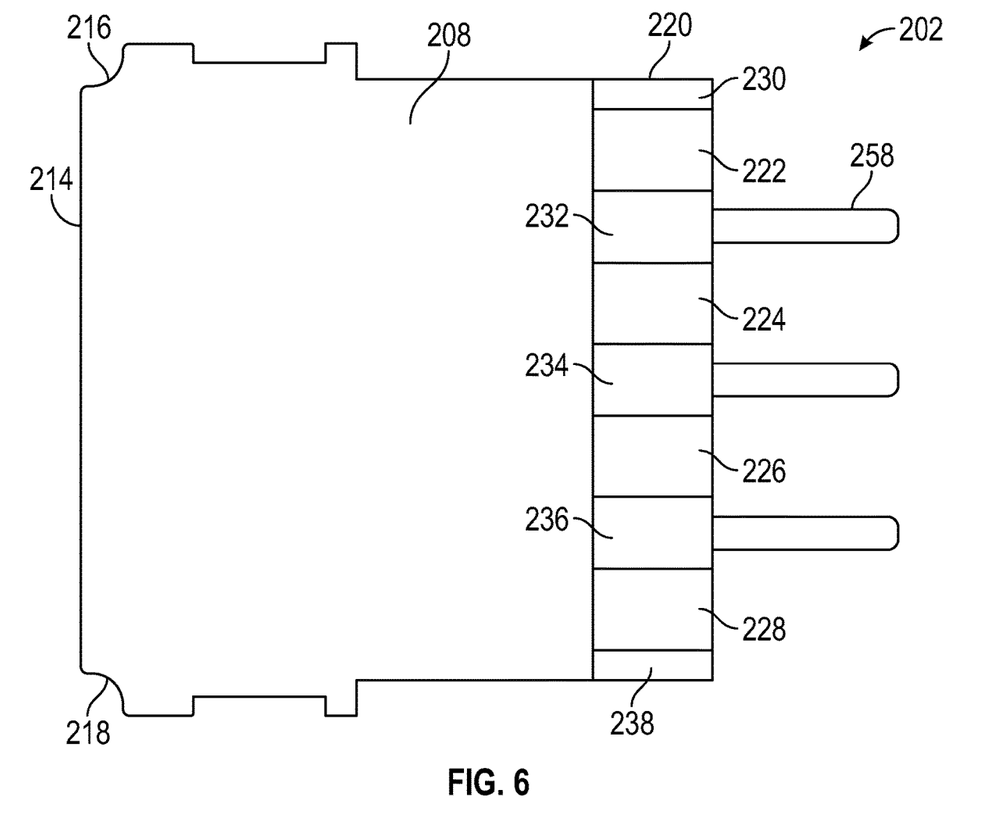
FIG. 6 is a top view of an internal component of a fiber optic connector in an exemplary embodiment.
Figure 7:
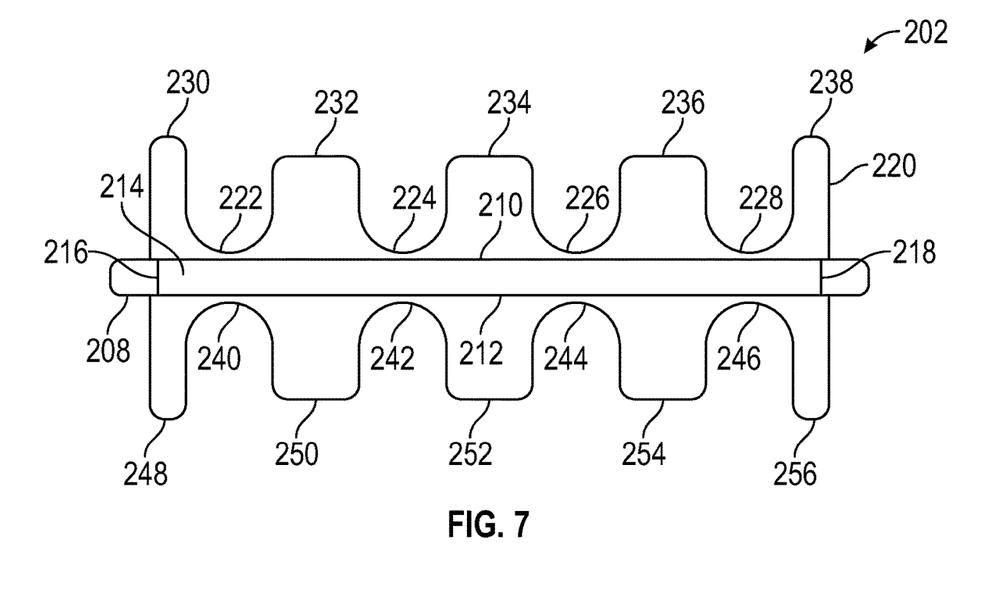
FIG. 7 is a front view of the internal component of FIG. 6.

FIGS. 3 and 4 show perspective views of the label 100 partially adhered to an internal component 202 (e.g., an internal brace) of a fiber optic connector 200, and FIG. 5 shows a perspective view of the label 100 fully adhered to the internal component 202. FIGS. 6 and 7 show top and front views of the internal component 202. The connector 200 includes a housing 204 configured to receive ferrules 206 and at least partially receive one end of the internal component 202. The internal component 202 aligns with the ferrules 206, such that fibers can pass through openings or grooves in the internal component and be terminated with corresponding ferrules 206. The housing 204 includes a keying element 205 extending along an outer side surface of the housing 204. The keying element 205 can assist with orientation and insertion of the connector 200 into a corresponding adapter.

With reference to FIGS. 6 and 7, the internal component 202 includes a main body portion 208 defining a substantially rectangular configuration with substantially planar top and bottom surfaces 210, 212. The proximal edge 214 of the main body portion 208 can be substantially linear and includes inwardly directed grooves on opposing side edges 216, 218. The opposing distal edge of the internal component 202 includes a guiding block 220. The guiding block 220 extends substantially equally from both the top and bottom surfaces 210, 212 of the main body portion 208 in a perpendicular orientation relative to the main body portion 208. The guiding block 220 includes four grooves or valleys 222-228 separated by extensions or peaks 230-238 extending from the top surface 210, and four grooves or valleys 240-246 separated by extensions or peaks 248-256 extending from the bottom surface 212. The guiding block 220 can have any number of peaks and valleys, depending on the number of fiber optic terminations being made. When assembled, the valleys 222-228, 240-246 align with the ferrules 206 within the connector housing 204 to clearly indicate where fibers should be routed for termination. The internal component 202 includes terminals 258 extending from the distal end of the guiding block 220.

As illustrated in FIGS. 3 and 4, the label 100 can initially be oriented such that the key indicator 124 points towards the keying element 205 of the connector 200. Rotating the label 100 to align the key indicator 124 in the proper position relative to the keying element 205 ensures that the label 100 is correctly adhered to the internal component 202. The backing sheet 108 can be removed to expose the adhesive and the label 100 can be positioned on the top surface 210 of the internal component 202 such that the cutouts 120, 122 substantially align with the proximal edge 214 of the internal component 202. The cutouts 120, 122 provide a visual indicator for where the label 100 should be folded over the proximal edge 214. The user can approximately center the label 100 between the side edges of the internal component 202. Next, the user can wrap the label 100 around the proximal edge 214 of the internal component 202 to adhere the second half of the label 100 to the bottom surface 212 of the internal component 202.

Once adhered, the fiber designations 130-144 align or substantially align with the valleys 222-228, 240-246 on the respective sides of the internal component 202, providing a visual guide for termination of the appropriate fibers in each location. The color and number associated with each of the fiber positions provides combined guides for routing of the fibers. Thus, the label 100 provides a clear guide for the technician during termination of fibers in order to reduce the risk of termination errors, and further provides a convenient visual guide for inspection of the terminated fibers.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A fiber optic connector, comprising:
   a fiber optic connector housing;
   an internal component at least partially disposed within the fiber optic connector housing, the internal component including a first or top side, an edge, and a second or bottom side opposing the first or top side; and
   a label adhered to at least a portion of the internal component;
   wherein:
   the label includes (i) a main body section including a top surface and bottom surface opposing the top surface, the main body section including a lateral axis extending through first and second side edges of the main body section, the lateral axis dividing the main body section into a first side and a second side, (ii) a first group of fiber designations located on the first side of the main body section, the first group of fiber designations corresponding with a first group of fibers to be terminated in the fiber optic connector, and (iii) a second group of fiber designations located on the second side of the main body section, the second group of fiber designations corresponding with a second group of fibers to be terminated in the fiber optic connector;

the bottom surface of the first side of the main body section of the label is adhered to the first or top side of the internal component such that the first group of designations is located on the first or top side of the internal component;

the main body section of the label is wrapped around the edge of the internal component;

the bottom surface of the second side of the main body section of the label is adhered to the second or bottom side of the internal component such that the second group of designations is located on the second or bottom side of the internal component;

wherein the internal component includes a guiding block on each of the first or top side and the second or bottom side extending perpendicularly from the respective first or top side and the second or bottom side, each guiding block including peaks and valleys configured to guide routing of the respective first and second group of fibers to be terminated in the fiber optic connector; and wherein the fiber optic connector includes a keying element extending along an outer surface, the keying element configured to assist with orientation and insertion of the fiber optic connector into a corresponding port or adapter.

2. The fiber optic connector of claim 1, wherein the first and second groups of fiber designations include numerical values corresponding with fiber positions for routing of the first and second groups of fibers to be terminated in the fiber optic connector.

3. The fiber optic connector of claim 2, wherein the numerical values in the second group of fiber designations is inverted relative to the numerical values in the first group of fiber designations.

4. The fiber optic connector of claim 2, wherein the numerical values are sequentially from 1 to 8.

5. The fiber optic connector of claim 4, wherein the numerical values sequentially alternate between the first group of fiber designations and the second group of fiber designations.

6. The fiber optic connector of claim 1, wherein the first and second groups of fiber designations are color-coded based on a fiber subunit color code.

7. The fiber optic connector of claim 6, wherein the fiber subunit color code is based on a TIA-598 industry standard.

8. The fiber optic connector of claim 1, wherein the label comprises a first cutout inwardly formed in the first side edge of the main body section, and a second cutout inwardly formed in the second side edge of the main body section.

9. The fiber optic connector of claim 8, wherein the first and second cutouts are aligned with the lateral axis, and serve as a locator for positioning of the main body section of the label relative to the edge of the internal component of the fiber optic connector.

10. The fiber optic connector of claim 8, wherein a width of the main body section as measured between the first and second side edges is dimensioned greater than a width of the main body section at the first and second cutouts.

11. The fiber optic connector of claim 1, wherein the label comprises a first key indicator including an arrow on the first side of the main body section, and the first key indicator orients the main body section of the label relative to the keying element of the fiber optic connector during adhering of the label to the internal component of the fiber optic connector.

12. The fiber optic connector of claim 11, wherein the label comprises a second key indicator including an arrow on the second side of the main body section, the second key indicator inverted relative to the first key indicator.

13. The fiber optic connector of claim 1, wherein the label comprises a text area including information regarding a polarity convention of the first and second groups of fiber designations.

14. The fiber optic connector of claim 1, wherein the label comprises adhesive applied to the bottom surface.

15. The fiber optic connector of claim 14, wherein the label comprises a backing sheet applied to the adhesive.

16. The fiber optic connector of claim 1, wherein the peaks and valleys of each guiding block define grooves corresponding with the respective first and second groups of fiber designations.

17. A method of applying a label to a fiber optic connector, comprising:
    adhering a bottom surface of a first side of a main body section of the label to first or top side of an internal component of the fiber optic connector such that a first group of designations of the label is located on the first or top side of the internal component of the fiber optic connector, wherein the first group of fiber designations is located on a top surface of the first side of the label and the first group of fiber designations correspond with a first group of fibers to be terminated in the fiber optic connector;
    wrapping the main body section of the label around an edge of the internal component of the fiber optic connector; and
    adhering a bottom surface of a second side of the main body section of the label to a second or bottom side of the internal component of the fiber optic connector such that a second group of fiber designations of the label is located on the second or bottom side of the internal component of the fiber optic connector, wherein the second group of fiber designations is located on the top surface of the second side of the label and the second group of fiber designations correspond with a second group of fibers to be terminated in the fiber optic connector;
    wherein the main body section of the label includes the top surface and the bottom surface opposing the top surface, the main body section including a lateral axis extending through first and side edges of the main body section, the lateral axis dividing the main body section in the first side and the second side;
    wherein the fiber optic connector includes the internal component having the first or top side, the edge, and the second or bottom side opposing the first or top side;
    wherein the internal component includes a guiding block on each of the first or top side and the second or bottom side extending perpendicularly from the respective first or top side and the second or bottom side, each guiding block including peaks and valleys configured to guide routing of the respective first and second group of fibers to be terminated in the fiber optic connector; and wherein the fiber optic connector includes a keying element extending along an outer surface, the keying element configured to assist with orientation and insertion of the fiber optic connector into a corresponding port or adapter.

* * * * *